Figure 9:
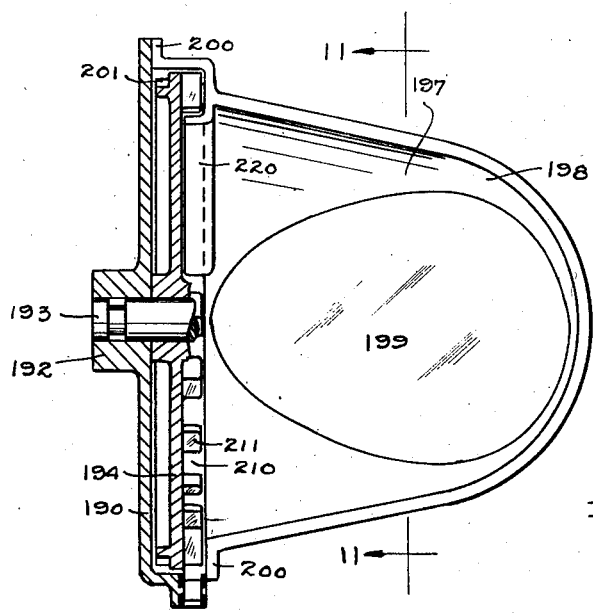

Dec. 9, 1930.                D. KELLEHER                 1,784,631
                           NUT TAPPING MACHINE
                    Filed Oct. 21, 1927        9 Sheets-Sheet 1
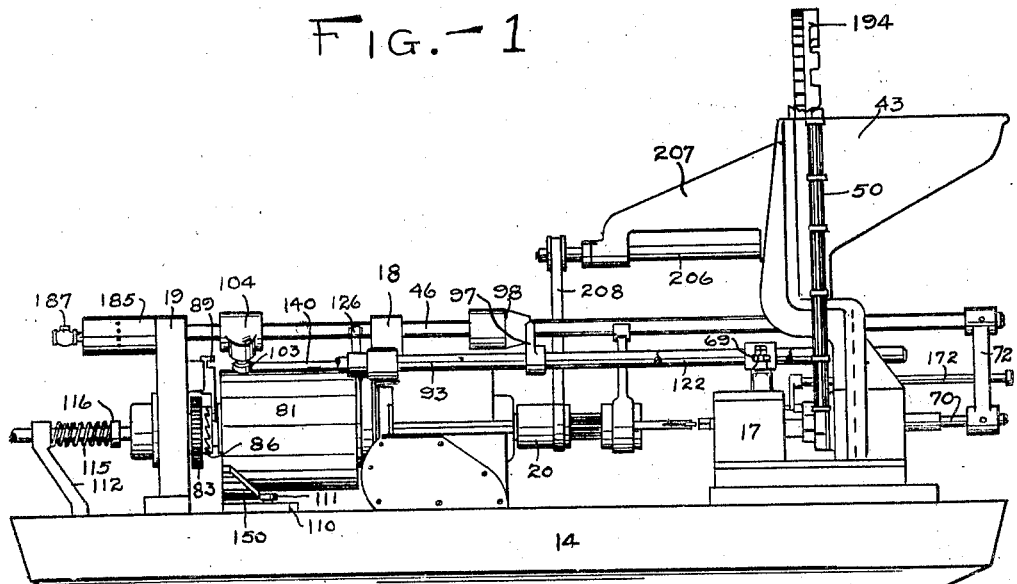
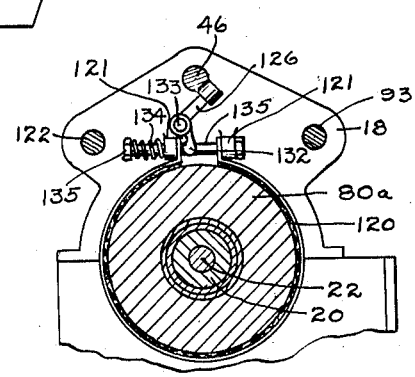
Inventor
Daniel Kelleher
By Bates, Macklin, Golrick & Teare
Attorney

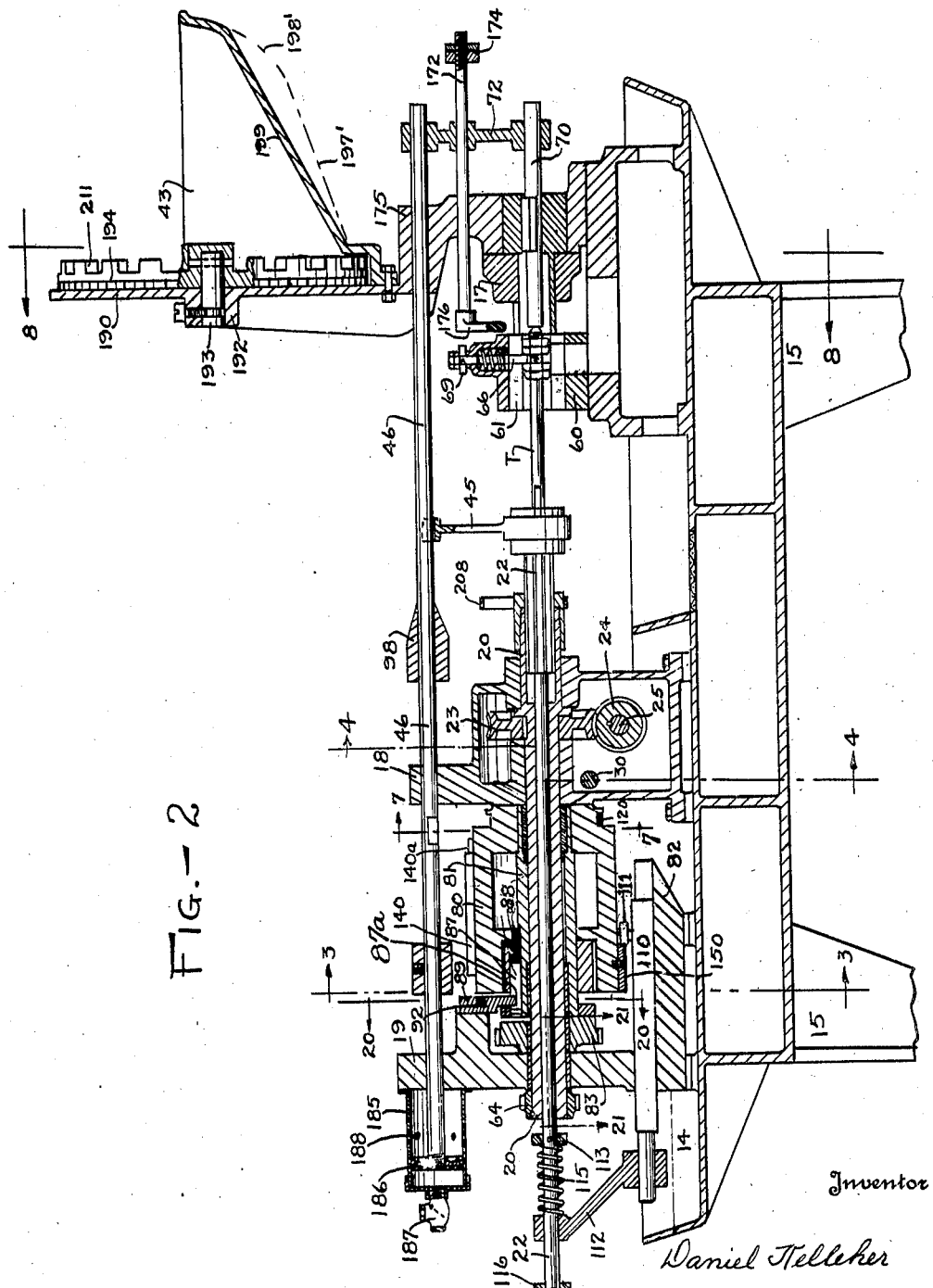

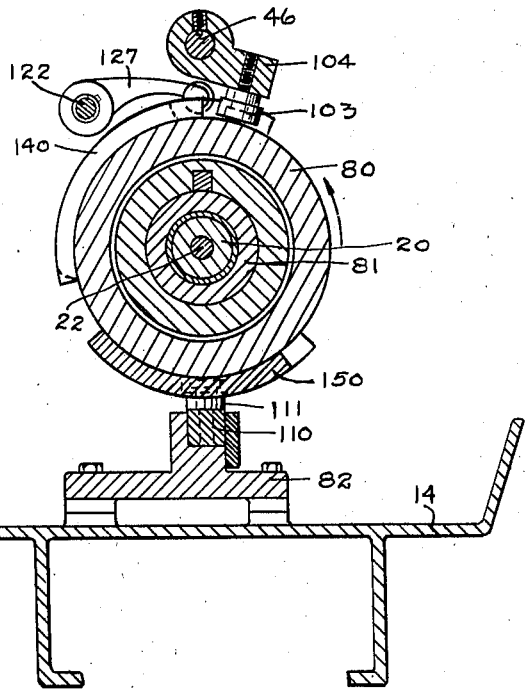
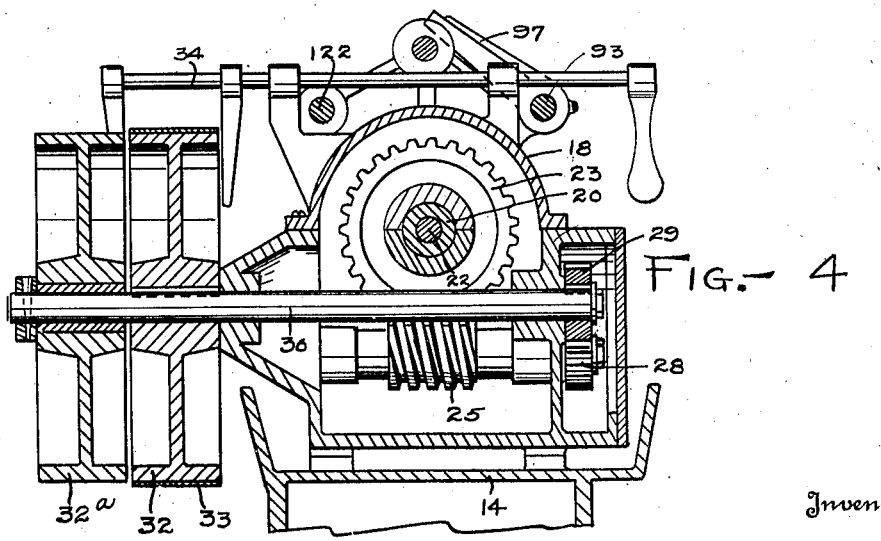

Dec. 9, 1930.  D. KELLEHER  1,784,631
NUT TAPPING MACHINE
Filed Oct. 21, 1927  9 Sheets-Sheet 4
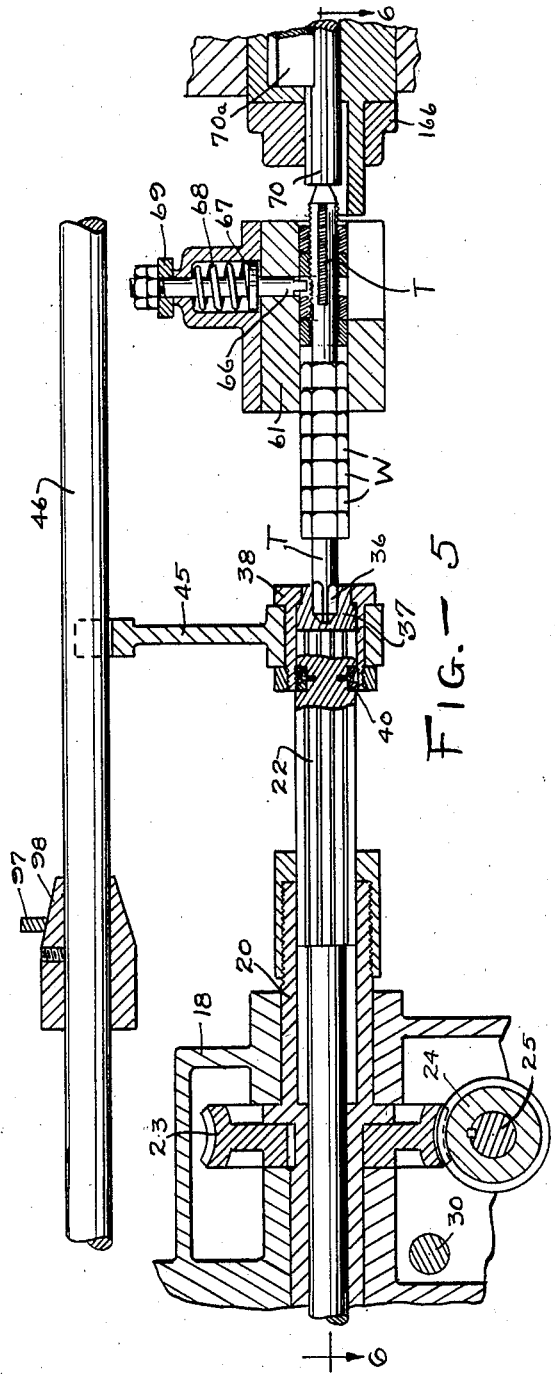
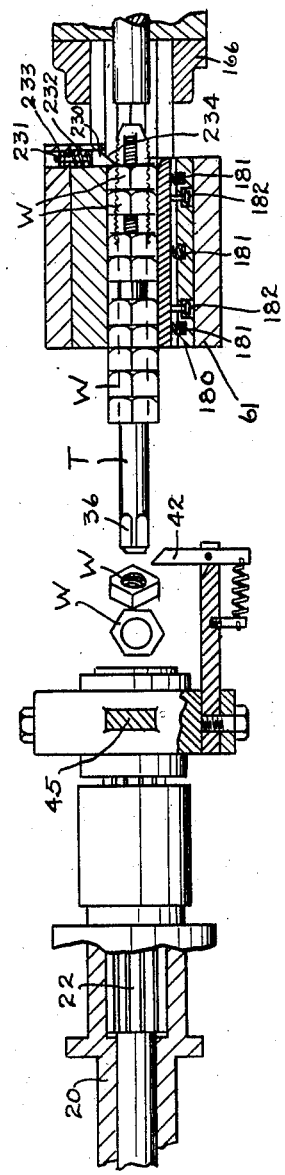
Inventor
Daniel Kelleher
By Bates, Macklin, Golrick & Teare
Attorney

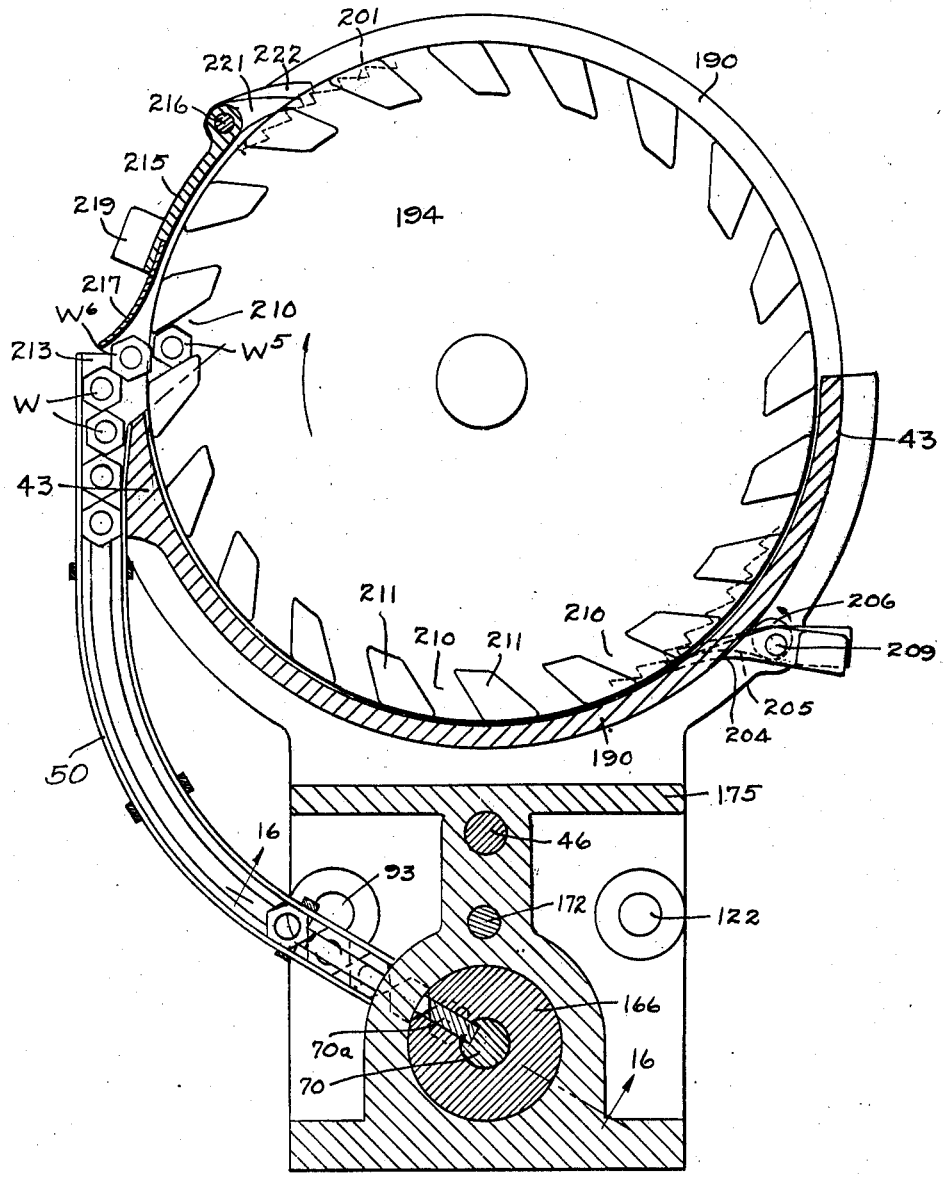

Dec. 9, 1930.  D. KELLEHER  1,784,631
NUT TAPPING MACHINE
Filed Oct. 21, 1927   9 Sheets-Sheet 6

Inventor
Daniel Kelleher
By
Bates, Macklin, Golrick & Teare
Attorneys

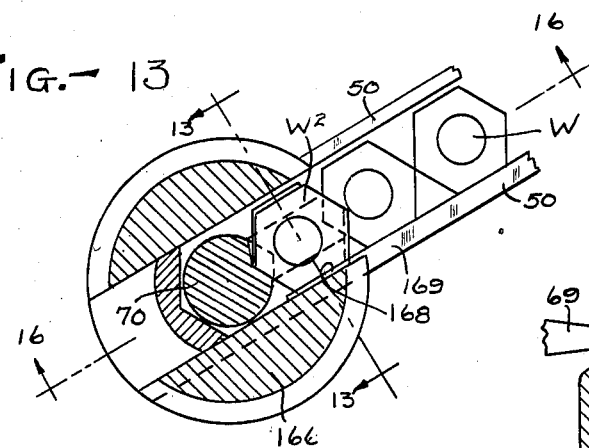
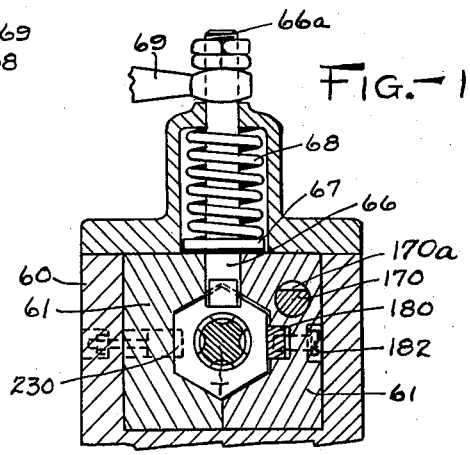
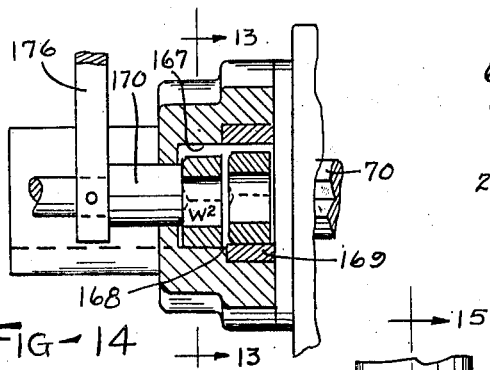
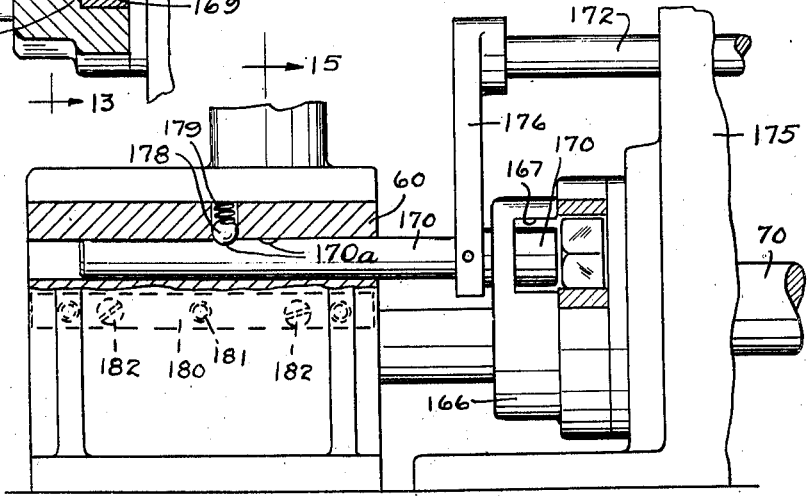

Dec. 9, 1930.                D. KELLEHER                1,784,631
                           NUT TAPPING MACHINE
                         Filed Oct. 21, 1927          9 Sheets-Sheet 8
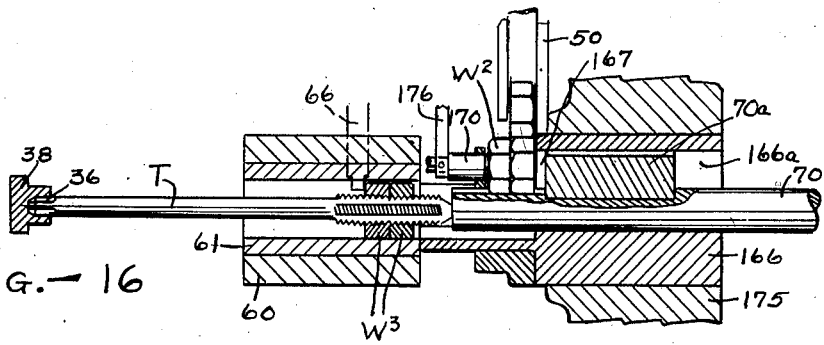
FIG.—16
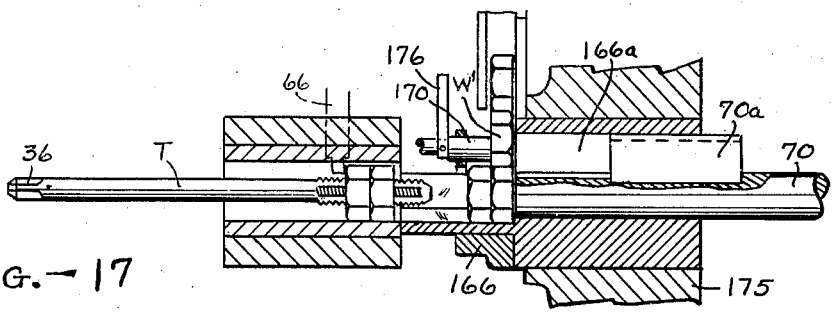
FIG.—17
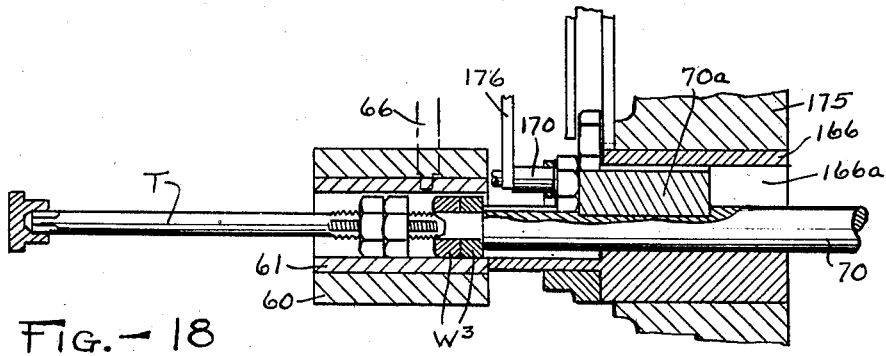
FIG.—18
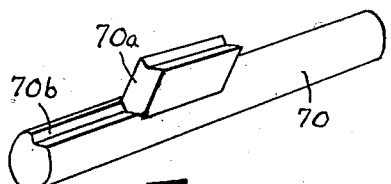
FIG.—19
Inventor
Daniel Kelleher
By Bates, Macklin, Golrick & Teare
Attorneys Dec. 9, 1930.  D. KELLEHER  1,784,631
NUT TAPPING MACHINE
Filed Oct. 21, 1927  9 Sheets-Sheet 9
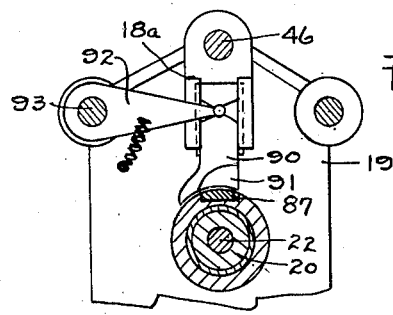
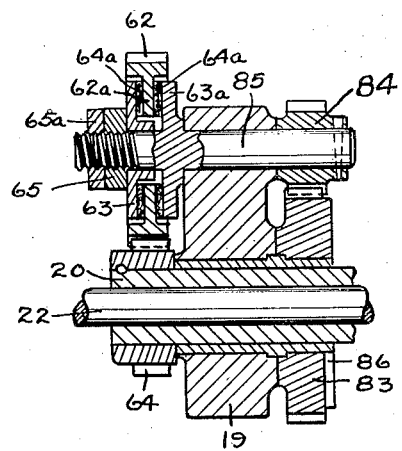
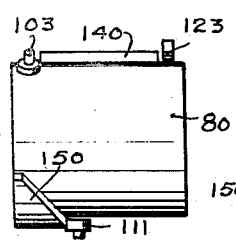
Start to Tap
FIG.- 22
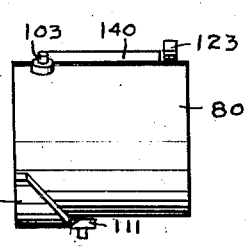
Finish Tapping
FIG.- 23
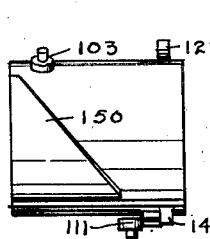
Start Stripping
FIG.- 24
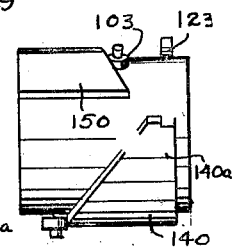
Stripping
FIG.- 25
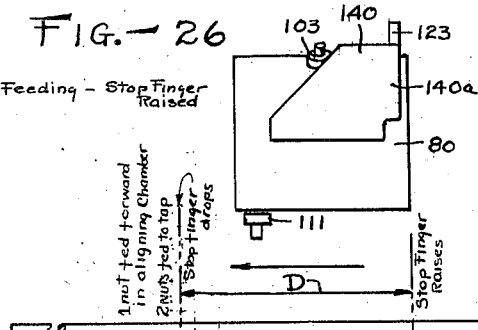
FIG.- 26
Feeding - Stop Finger Raised
FIG.- 28
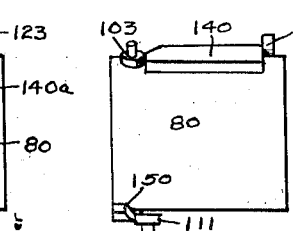
FIG. 27
Completing Feed & Driving Chuck to Tap
Inventor
Daniel Kelleher
By Bates, Macklin, Golrick & Teare
Attorneys Patented Dec. 9, 1930

1,784,631

UNITED STATES PATENT OFFICE

DANIEL KELLEHER, OF BEREA, OHIO, ASSIGNOR TO THE FOOTE-BURT COMPANY, OF CLEVELAND, OHIO, A CORPORATION OF OHIO

NUT-TAPPING MACHINE

Application filed October 21, 1927. Serial No. 227,677.

This invention is concerned with metal cutting machines, and the general object thereof is the provision of a continuously operating non-reversing automatic machine for effecting the termination of finished internal surfaces on the articles to be machined.

A further object of my invention is the provision of a metal cutting machine or machine tool which is adaptable to the use of a novel method of arranging a plurality of pieces of work which are to be internally machined with the openings thereof in alignment whereby the aligned pieces may be presented to a rotatable cutting tool having a shank adapted to receive the finished pieces, the machine being such that during its continuous operation the same number of pieces may be removed from the tool shank as are presented to the cutting end of the tool upon each presentation of work to the tool. In other words, my invention contemplates a machine tool which will automatically feed a plurality of pieces of work to the cutting tool whereby the tool will effect the completion of its cutting action on a plurality of pieces of work during each complete cycle of operations of the machine.

A more specific object of my invention is the provision of a tapping machine which will be automatically operated to advance the tap through and thread a plurality of pieces of work as the pieces are automatically fed in groups to the machine. A still further object of my invention is the provision of various improvements in connection with a machine tool such as I disclose in Patent No. 1,645,285 issued October 11, 1927. Other objects of my invention will hereinafter become apparent from the following description which refers to the accompanying drawings illustrating a preferred embodiment thereof, and the essential characteristics of the invention are summarized in the claims.

Figure 10:
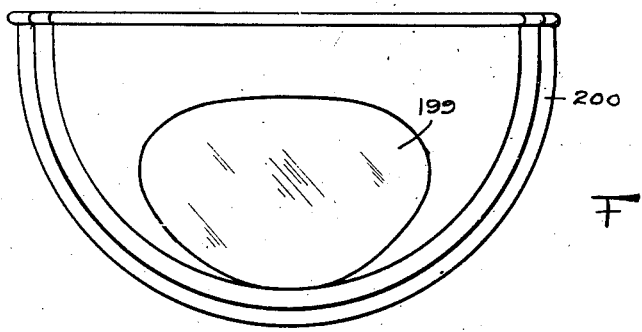
Figure 11:
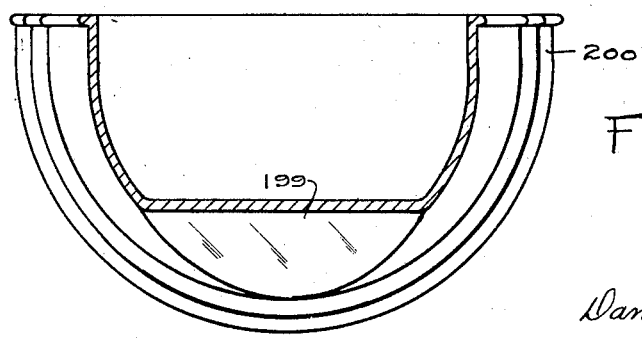

The drawings represent in Fig. 1 a side elevation of an automatic machine embodying the features of my invention; Fig. 2 is a cross sectional elevation taken longitudinally of the machine, as viewed in Fig. 1; Fig. 3 is a cross sectional enlargement taken through the spindle head of the machine along the line 3—3 of Fig. 2; Fig. 4 is a transverse cross sectional view taken through the machine along the line 4—4 of Fig. 2; Fig. 5 is an enlarged cross sectional view of a work holding means and cooperating means for driving the tool; Fig. 6 is a similar view taken horizontally through the tap driving means and work holding means; Fig. 7 is a cross sectional detail taken through a brake mechanism which is arranged to act on a camming mechanism; Fig. 8 is a transverse sectional elevation through the work hopper and showing the feed chute for the work as indicated by the line 8—8 on Fig. 2; Fig. 9 is a sectional plan view of a work hopper taken through the axis of the work selecting disc of the hopper; Figs. 10 and 11 are detailed views of the hopper mechanism; Fig. 12 is a detail elevation of the work holding means associated with the work aligning means; Fig. 13 is a cross sectional detail taken substantially along the lir. 13—13 of Fig. 14; Fig. 14 is a detail fragmentary view of part of the work aligning mechanism; Fig. 15 is a cross sectional view of the work holding means taken substantially along the line 15—15 of Fig. 12; Figs. 16, 17 and 18 are cross sectional views showing various operative positions of the tap; Fig. 19 is a perspective detail of a work aligning and feeding plunger; Fig. 20 is a cross sectional detail taken through the spindle head of the machine substantially along the line 20—20 of Fig. 2 showing an intermittently operated clutch mechanism; Fig. 21 is a horizontal cross sectional view of a gear train associated with the tap spindle; Figs. 22 to 28 inclusive are diagrammatic representations of the various operative positions of a camming mechanism.

My present invention is concerned with a machine tool comprising a completely automatic machine having mechanism for rotating the tool, other mechanism for holding some of the work being cut or already cut by the tool, and I combine with these mechanisms, groups of elements operated in timed relation for intermittently rotating the tool and for holding and releasing the work in an effective manner without causing any distortion of the work during the cutting action of the tool. These mechanisms are embodied in a machine in co-ordinated functional relationship in such manner as to cause simultaneous operations on a plurality of pieces of work and require only a minimum number of parts which may be accurately and economically manufactured, and the times of functioning of the various mechanism comprising the machine, is controlled by an advancing movement of the tool. The general operative arrangement of such a machine is disclosed in the patent hereinbefore referred to as being adapted to the cutting of internal threads on pipe conduits, and the present machine functions automatically after the tool has made a certain number of predetermined cutting revolutions through the work being operated upon, and, as in the prior machine, the point of application of the mechanical force for initiating the cycle of operations of the present mechanisms which re-position the tool for the beginning of new cutting operations, is at the forward end of the tool.

The present machine is disclosed as being adapted to the threading of a plurality of pieces of work for each complete cycle of automatic operations thereof by utilizing the method of arranging a plurality of pieces of work with the holes thereof to be machined in alignment whereupon the aligned pieces are shifted into the operating zone of the cutting tool and during this shifting operation a corresponding number of finished pieces are removed from the tool shank.

In Fig. 1 of the drawings, I show such a machine for threading hexagonal nuts as comprising a base or lubricant retaining pan, 14, mounted on standards or legs 15. The pan 14 is suitably formed to support at one end thereof work holding mechanism generally indicated at 17, for holding the work when being tapped, and a spindle head 18 and a bearing frame 19 which supports a camming mechanism to be hereinafter described.

The spindle mechanism for rotating the tap may comprise a spindle sleeve 20 (see Fig. 2) rotatably mounted in the spindle head or frame 18 and this sleeve carries a longitudinally shiftable tap engaging member 22, the latter being splined to the forward end of the spindle sleeve whereby it may be rotated by the spindle sleeve. The spindle carries a worm wheel 23 which is keyed thereto and the worm wheel is driven by a worm 24 mounted on a transversely extending shaft 25, (see Figs. 2 and 4) the latter being provided with a suitable bearing support comprising a part of the spindle head 18. Mounted on one end of the shaft 25 is a gear 28 (see Figs. 4 and 5) which is driven by a pinion 29 carried on an end of a transversely extending pulley shaft 30. The shaft 30 may be driven by any suitable means such as a pulley 32 and a belt 33. A suitable belt shifting mechanism, as shown at 34, may be provided, if desired, for shifting the belt 33 to a loose pulley 32a when it is desired to stop the machine. The tap engaging member 22 is shifted during certain periods of the cycle of operations of the machine to engage and disengage a formed end 36 on the shank of the tap T, and no tap engaging means is provided on this member other than a member 37 having a socket complementary in shape to the formed end 36 of the tap. This socket member may be removably secured to the end of the member 22 whereby socket members of various sizes and shapes corresponding to the sizes of the tools being used may be carried by the tool engaging member 22. A rotating member 38 is provided to hold the socket member 37 in engagement with the splined end of the member 22 and the member 38 is held in position on the member 22 by a split collar 40 which fits a groove formed in the splined end of the member 22.

The member 22 is positively advanced to engage the shank but urged resiliently into engagement therewith and positively retracted from the tap shank to free the end of the tap shank by a camming mechanism hereinafter described, whereby a plurality of pieces of the work W may be removed from the tap shank during each cycle of operations of the member 22, and the mechanism for positively shifting the member 22 relative to the spindle 20 and the tap is associated with the spindle. When the member 22 is shifted rearwardly to the left on Figs. 2 and 6, the tap with work W thereon, is retained by the work supporting or gripping mechanism and, in the present instance, two of the pieces of work W are removed from the tap shank by a finger 42 prevented from rotation by an upwardly extending arm 45 which bears freely on a control rod member 46.

The functioning of the control rod 46 is determined by an advancing movement of the tap.

The work W may be fed to the work holding means 17, through a race or magazine 50, which extends downwardly from a hopper 43 to work aligning mechanism to be described, one element of which registers with the tap and cooperates with associated elements to align the work and feed it in multiple to a longitudinal passageway formed in the work holding means in alignment with the axis of the tap. The work aligning mechanism is illustrated in Figs. 2, 5, 6 and 13 to 19.

The work holding means may comprise a stationary chucking frame 60 adjustably mounted on the bed or pan of the machine frame and suitably formed to support a removable block or sleeve 61 which is held in the desired position by any suitable means.

This block is provided with a bore corresponding to the outside shape of the work to be tapped and in the present instance the bore corresponds to the hexagonal shape of the nuts W plus a slight clearance whereby the work may freely pass along the shank of the tap T. The block 61 is bored radially to receive a plunger 66 which serves to retain two nuts from moving along the hexagonal bore of the block 61 during the major portion of a complete cycle of operation of the machine whereby the tap is bodily advanced by the retained nuts during such portion of the cycle. The plunger member 66 is provided with a flange 67 whereby it may be acted upon by a spring 68 normally urging it to an inward operative position where it functions to receive the longitudinal thrust reaction of the cutting action of the tap upon the nuts. The plunger is retracted by a lever 69 operated in timed relation to the operation of the feeding mechanism in a manner hereinafter set forth.

The threads of the tap T are arranged to be of sufficient length to extend through at least two pieces of work as shown in Figs. 16 to 18 whereby two pieces of work will always remain in engagement with some of the threads on the tap at the completion of one cycle of tapping operation of the machine. The tap, after having completed this thread cutting action, and with two pieces of work still in engagement with some of the tap threads, is returned to an initial starting position by a plunger member 70 acting indirectly on the tap when it feeds two new pieces of work to the tap from the aligning chamber at the end of the race 50. In other words when the member 70 is moved toward the spindle of the machine it thrusts two new aligned pieces of work into the block 61 and in doing so, the new pieces of work shift the tap toward the spindle of the machine, thus causing the pieces of work previously threaded by the tap to be positioned on the opposite side of the plunger 66 when the latter is in a retracted position. The plunger 70 during a certain part of the cycle of operations of the machine is operated by the rod 46 through a connecting arm 72. The rod 46 through connecting arm 72 also serves to operate the work aligning means associated with the magazine race 50 and the feed rod or plunger 70.

The work aligning mechanism is associated with the bottom of the race 50 in such a manner that as the nuts are fed downwardly through the race 50 in single file each alternate nut in the file is offset relative to the raceway in order to be aligned with a following nut, i. e. rank formation, two abreast. The two aligned nuts are then permitted to drop singly but again in rank formation, where they substantially align with the longitudinal axis of the tap and the bore of the work holding means. The two pieces so arranged are then shifted axially into cooperative relation to the tool.

As shown in Figs. 12, 13 and 14, the race 50 leads into a frame 166 of a nut aligning mechanism at an angle of substantially 30° relative to the horizontal. The nuts come down the race-way with the hexagonal edges thereof in line contact. The frame 166 is provided with an aligning chamber 167 (see Figs. 12 and 14) which is formed in the frame 166, so that the latter, when placed upon the machine in proper position will dispose the aligning chamber immediately above the feeding end of the feed plunger 70, whereby the nuts may drop from the race-way and ride upon the top side of the feed plunger. To offset every other nut, the feed plunger is provided with a block 70a fixed thereto but set back from the operative end of the plunger a distance greater than the thickness of three nuts, and the block 70a has a corresponding length. The block 70a is permitted to move with the plunger by sliding in a slot 166a formed in the frame member 166. The function of the block 70a is two-fold, the end thereof serving to engage a nut W2 which is dropped from the race 50 to the V portion 70b of the feed rod 70 and move such nut W2 to the left, as shown in Fig. 18, and to maintain the next nut in the race-way. When the feed plunger has shifted to the left to position the two nuts labeled W3 in the work holding means, then the plunger remains in this position until the tap has passed through the nuts W3 in its threading action, as shown in Fig. 16. As the tap pushes the rod 70 to the right, the block 70a recedes from the nut W2, but the shape of the V portion formed in the feed rod 70 is such as to permit the nut W2 to cant slightly thereon, whereby its edge abuts a shoulder 168 afforded by a member 169 comprising part of the race 50. This shoulder serves to prevent the nut W2 from being carried back through frictional contact with the feed rod 70, and the nut W2 is thus prevented from interfering with subsequent dropping of the following nut from the race-way to the V groove of the feed plunger as the latter shifts to the right. As the feed rod 70 is shifted toward its extreme right position, as shown in Fig. 17, by a camming mechanism to be more fully hereinafter described, but before it has been shifted completely to its extreme right position the nut W2 is permitted to drop into alignment with the hexagonal bore of the work holding members 60. In order to guide a nut while traveling along the race-way as at W1, Fig. 17, and in order to prevent the nut from canting or jamming in the aligning chamber when it is being offset relative to the raceway to the position of the nut W2 by the shifting action of the block 70a as just described, a means is provided for the first guiding and later engaging the face of the nut opposite the plunger member 70a, whereby the nut will be held in the desired position. This means, as shown, comprises a plunger 170 which is shifted by the connecting arm 72 of the feed rod 70 through a rod 172 slidably mounted to extend through the standard 175, which supports the race 50 and hopper mechanism into sliding engagement with the connecting arm 72 as through a suitable bore in the arm 72. The rod 172 has a collar 174 opposite the arm 72, the function of which will be presently mentioned. On the inner end of the rod 172 is an arm 176 which engages the nut engaging plunger 170 and this nut engaging plunger extends into a suitable bore in the chuck block 60 to properly support it in slidably operating position. Detent means in the form of a ball 178 and spring 179 are suitably mounted in the chuck frame to engage notches 170a formed in the plunger member 170 to maintain it in either of its two extreme positions. When the feed rod 70 is shifted to the position approaching its maximum retracted position to the right, the arm 72 engages the collar 174, thus causing the end of the plunger 170 to be shifted into the aligning chamber 167 to the position shown in Fig. 17 adjacent W1, where it remains until the plunger 70 reverses in its movement and starts its feeding movement leftward (see Fig. 18), and as the block 70a begins to offset the nut relative to the race-way, the nut bears against the end of the plunger 170, pushing the plunger ahead of it until nearly in its final offset position as in Fig. 18 at which time the detent 178—170a acts to relieve further counter pressure of the plunger against the nut. Thus, when the plunger is pushed back as by the end of the tap to about the position shown in Fig. 17, another nut may fall into place beside the nut at W2.

The control rod 46 enters into the foregoing cycle of feeding operations and its actuation will now be described in detail. Rotatably mounted upon the tap rotating spindle 20 is a camming mechanism which effects the operation of the control rod 46 and the intermittent operation of the camming mechanism as stated is determined by an advancing movement of the tap. This camming mechanism is also utilized for operating a slide mechanism which longitudinally actuates the tap engaging member 22 and also the plunger 66 of the work holding means. The spindle is constantly driven through the driving means hereinbefore described and the camming mechanism is intermittently driven by the spindle through a gear train and a clutch mechanism operated by the rod 46 when the latter is moved by the tap and a brake mechanism serves to arrest movement of the camming mechanism when the clutch is disengaged from the tap spindle.

Before describing in detail the elements comprising the camming mechanism and its driving means, reference will be made to a diagrammatic representation of the activity of the rod 46 as shown in Fig. 28. First, assume that the initial movement of the cycle of operations in the control rod 46 is from the left to the right. The movement of the control rod 46 as represented by the distance "A" is effected by the advancing movement of the tap which moves the feed plunger 70 outwardly (see Figs. 5 and 16 which show the tap in this advanced position), and this movement of the feed rod is transmitted through the arm 72 (see Fig. 2) to the control rod 46 when the tap extends through the work being threaded, to the position shown in Fig. 5. A clutch mechanism (not yet described) is then caused by rod 46 to effect the coupling of the tap spindle to the cam mechanism. There is a period of rest "B" in the control rod movement while the cam mechanism operates to retract the tap engaging member 22 from the tap, and in this action two pieces of work are stripped or removed from the tap shank as shown in Fig. 6. As the camming mechanism continues in its movement, the control rod is shifted further to the right by the camming mechanism through a distance represented by C, (see Fig. 22) and during this movement the feed plunger 70 is shifted outwardly by the camming mechanism to permit new pieces of work to drop out of the aligning chamber 167 into alignment with the tap axis, and the control rod, through mechanism to be described withdraws the plunger 66 during the outward movement of the feed plunger 70. During this outward movement of feed plunger 70 two nuts are dropped side by side into a position to be fed by the rod 70 into the work holding means in the manner hereinbefore described (see Figs. 16 and 17). Continued rotation of the camming mechanism then reverses the movement of the rod 46 from right to left, as represented by distance D, thus causing the feed plunger 70 to thrust two pieces of work into a position to be engaged by the work holding block or chuck 60, and the feed plunger also shifts the tap with the previously threaded work thereon to the initial tap starting position. The pieces of work on the tap are thus still in contacting position with the hexagonal bore of the work holding means or chuck 60, and they are held frictionally by a bar 180 which is urged into engagement with the nuts by springs 181, the bar being maintained into position by studs 182. During the period D of the movement of the control rod 46, the tap engaging member 22 is advanced to its tap engaging position, and the plunger member 66 through further rotation of the cam drum acts as a longitudinal stop for the two new pieces of work now positioned in the work holding means.

To positively hold the successive nuts in contact with the tap until at least some of the tap threads become active, I provide a spring latch (Fig. 6) past which both nuts (at W3) are shoved, the latch then acting on the second nut to hold both in the chucking frame. The latch may comprise a spring pressed plunger 230 having a reduced shank 231 extending into a recess 232 and having a nut 233 adapted to engage the floor of the recess. The nose of the pawl is beveled as at 234 so that the nuts moving past the nose retract the plunger against the action of a compression spring 235, and when the nuts are in the position shown in Fig. 18 the nose of the latch drops behind the second nut W3.

With the foregoing cycle of co-related movements of the tap in mind, the tap engaging member 22, the plunger 66 and the control rod 46, the camming mechanism, the clutch control and the means for operating the plunger 66 will now be described.

The camming mechanism of the present machine as in the former machine is arranged in coaxial alignment with the tap spindle. As shown in Fig. 2, this mechanism may comprise a cam barrel 80 which is fixedly mounted on a clutch sleeve 81 rotatably mounted on an extension of the tap spindle sleeve 20 and a suitable frame member 19 is provided to properly support the extension of the spindle sleeve and the camming mechanism. The cam barrel sleeve 81 is clutched to a gear, rotatably mounted on the spindle sleeve 20 as shown at 83 (see Figs. 2 and 21) and the gear 83 engages a pinion 84 mounted on a jack shaft 85 carried by the machine frame member 19. The jack shaft 85 is driven by the spindle sleeve 20 through pinion 64 mounted on the end of the sleeve 20 and a gear 62 to the jack shaft 85.

A clutch operated by control rod 46 is provided for drivingly connecting the tap spindle 20 to the cam barrel sleeve 81 as follows: Formed on the gear 83 is a dental clutch formation 86. The latter member is engaged by a detent member or clutch plunger 87 (Fig. 2). The plunger member 87 is carried in a bore, formed in the cam barrel and sleeve 80 and extending parallel with the sleeve axis. A spring member 88 tends to normally urge the plunger member 87 into engagement with the dental clutch formation 86 to drivingly couple the spindle sleeve 20 to the cam barrel sleeve 81 but a slidable plunger camming member 89 in the nature of a slide member operatively positioned in a suitable slideway formed to extend on a portion 18a of the spindle head, maintains the clutch plunger in disengaging position during the threading movement of the tap. The member 89 has the lower end 90 thereof provided with a camming surface 91 which extends into a slot 87a (see Figs 2 and 20) of the clutch plunger 87 to withdraw the plunger out of engagement with clutch member to terminate the rotation of the cam barrel sleeve 81.

The clutch camming member 89 is raised by an arm 92 mounted upon a small rocker shaft 93 disposed along the upper part of the machine in parallel relation with control rod 46 (see Fig. 1) and the rock shaft 93 has fixed thereon an arm 97, the free end of which engages a conically shaped member 98 fixed to the control rod 46, whereby when the control rod 46 is shifted to the right by the advancing movement of the tap, the arm 97 is raised and accordingly the arm 92 (see Fig. 20) is raised, thus causing the member 89 to be retracted from the slot of the plunger 87, whereupon the plunger is snapped into engagement with the teeth 86 of the gear member 83 by the spring 88 and the tap spindle thus drives the cam barrel through the gear train hereinbefore described. When the control rod 46 is shifted to the left, thus shifting the coniform member 98 out of engagement with the arm 97, clutch camming member 89 drops down into the rotating path of the clutch plunger 87 and as the plunger engages the camming surface 91, of the member 89, the cam barrel is operatively disengaged from the tap spindle.

The rod 46, as stated, is first actuated by an advancing movement of the tap from left to right but only to the point where the conical member 98 effects the operation of the clutch to drivingly connect the tap spindle to the cam barrel. The further movement of the rod 46 from left to right is completed by cams mounted on the barrel to alternately engage roller 103 (see Fig. 1) carried by an arm 104 secured to the rod 46.

When the rod 46 is being returned from right to left by the camming mechanism to feed work out of the magazine race and to return the tap to starting position, the tap engaging member 22 is moved positively, by the camming mechanism described to the point of engaging the tap shank. The camming mechanism is then brought to rest as described. Thereafter, the spring member 115 urges the member 22 against the tap and until the tap shank is in the socket of the member 37 and during the subsequent advancing movement of the tap caused by the feed or lead screw action of the threaded work retained by the plunger member 66, the transmission of torque from the tap engaging member 22 to the tap causes the member 22 to follow the tap shank while remaining in driving engagement therewith.

The positive actuation of the member 22 to the tap engaging position is effected through a slide member 110 operatively mounted on a frame member 82. The slide member 110 accordingly has mounted thereon, a roller 111, properly disposed relative to the cam barrel to be engaged by the cams mounted thereon. The slide member 110 extends at one end of the frame to afford engagement with an arm 112 extending upwardly to slidably engage the outer end of the tap member 22 and interposed between the arm 112 and a collar 113 mounted on the tap engaging member 22, is the spring member 115 hereinbefore mentioned and which, when not being acted upon by the arm 112 is retained in a partly compressed condition by a collar 116 secured to the projecting end 21 of the tap engaging member 22. Thus, when the tap engaging member 22 is being withdrawn from the tap, the collar 116 (see Fig. 1) is in engagement with the arm 112.

It will be seen from the above that the spindle sleeve 20, and therefore the tap driving spindle, is rotated continuously when the machine is in operation. The cam, on the other hand, is rotated once whenever the clutching mechanism above described is actuated by the advancing movement of the tap. During the time that the cam is rotated the tap is longitudinally shifted with a plurality of nuts in engagement with its threads. If, for example, a defective nut should jam in the chuck head at such time there is great danger of breaking the tap and temporarily disabling the machine, or if the tap does not break some part of the mechanism might.

In order to prevent such breakage during the time the cam is active, I provide slippage in the cam gearing, as shown in Fig. 21. In this figure the jack shaft 85 is shown as having a pair of flanges 63 and 63a, one being a part of the shaft, and the other being slidably keyed to the shaft. The gear 62 has a web portion 62a borne upon at its opposite sides by friction discs 64a, each disc being tightly engaged by a respective flange 63 or 63a. The friction discs thus constitute the driving connection between the gear 61 and the jack shaft 85. Adequate pressure between the adjacent surfaces of the web, discs, and flanges is maintained by reason of the nut 65 which may be suitably locked into place by a jam nut 65a. In the event that work should jam in the chuck 60, as above mentioned, no breakage will result by reason of the continuous drive to the gear 61 from the sleeve 20 because the discs will merely slip on the adjacent surfaces, and the machine will be then rendered temporarily inoperative until the difficulty is remedied.

A brake mechanism for arresting the movement of the cam barrel 80 after it is operatively disengaged from the tap spindle, may comprise, as shown in Fig. 7, an expansible band 120 which extends around a reduced portion 80a of the cam barrel and is supported by ears 121 mounted on the gear housing 18. The brake band 120 is adjusted to exert sufficient friction on the barrel when the latter is not being driven by the tap rotating spindle so that the cam barrel immediately comes to rest when the spindle is drivingly detached from the cam barrel. The band 120 is contracted by a spring 134 carried by a rod 135 which extends through the free ends of the band 120 and a dog lever 132 carried by a rocker shaft 133 acts to apply or release the brake action of the band when the rocker shaft 133 is actuated by a rocker arm 126 mounted thereon; the rocker arm being disposed to be actuated by a surface formation on the control rod 46 when the latter is shifted by the camming mechanism in the manner described.

With the foregoing described mechanism in mind, a description of the means for operating the work retaining plunger member 66 will now be readily understood, and as shown in Figs. 1, 3, 4 and 15, the member is normally urged downwardly into work engaging position by the spring member, and is shifted upwardly out of work engaging position by an arm 69 bifurcated to engage the top end 66a of the member 66 and a cam surface 140a of a cam 140, to be presently described, is provided on the cam drum to operate a rocker lever 127 carried by a rocker shaft 122 which also carries the bifurcated arm 69; the shaft 122 being suitably mounted on the machine frame. The timing of the operation of this mechanism is such that the plunger 66 will be retracted when the tap is being shifted by rods 46 and 70 to a new starting position, and the tap by reason of its extension through two nuts per each cycle of operations automatically takes care of the proper spacing between the tapped pair of nuts, and the new pair of nuts, so that the plunger 66 may be properly interposed therebetween by its operating spring.

Having thus described in detail the various coordinated mechanisms embodied in the present form of my invention, a brief description of the cams incorporated in the camming mechanism will disclose that I effect the operation of a number of the mechanisms by the use of only two cams mounted on the cam barrel 80, and reference will now be made to the diagrammatic representation of the camming actions as disclosed in Figs. 15 to 20 inclusive.

In Figs. 22 to 27 a cam 140 and a cam 150 are shown as being respectively reverse in form and positioned in spaced apart relation on the cam barrel. It may be assumed for the moment that the beginning of the cycle of operations of the machine will find the cam barrel with the cams in the position shown in Fig. 22. The tap, in order to begin the operation of the machine has been manually provided with a piece of work in engagement with the threads thereof and two pieces of work to be tapped are inserted in the work holding means along with the piece of work in engagement with the tap threads to position the tap as shown in Fig. 11. Also there must be one piece in the aligning chamber as shown in Fig. 11. The belt 33 is shifted by the belt shifting mechanism 34 to drive pulley 32 and the tap spindle rotates the tap engaging member 22. The cam barrel as shown in Fig. 22 remains stationary. The spring 115 urges the member 22 into engagement with the tap shank by reason of the position of the roller 111. After the spindle rotates the tap, the member 22 follows the tap through the action of the spring 115. The tap causes the rod 46 to operate the clutching mechanism as hereinbefore described during the completion of its advancing movement. Thus, the cam barrel is rotated, but the lead on the cam 150 acts to compress the spring 115, due to the work being still held by the latch 230. As the cam barrel revolves further, the cam 140 engages the roll 111 to shift the tap engaging member 22 to the left out of engagement with the tap and while doing so causes the stripper finger 42 to remove two pieces of work from the tap as shown in Fig. 6. As the cam barrel thus rotates, the cam 150 reaches the roll 103, and shifts the roll 103 to the extreme right, thus causing the feed plunger 70, through operation of the rod 46, to be shifted from beneath the end of the magazine race, thus permitting two new pieces of work to drop into alignment with the tap. This shifting movement of plunger 70 repositions the working aligning plunger 170 to assist block 70a in the off-setting of one piece of work. The continued movement of the cam barrel then causes the cam 101 to retract the plunger 66 by acting on the roll 123 and attendant mechanism and the cam 140 to engage the roll 103 and shift it to the left as shown in Fig. 26, thus causing the feed plunger 70 to insert new work in the work holding means and to offset one nut relative to the race-way, and to thereby shift the tap to an immediate starting position. A continued rotation of the cam barrel then causes the cam 150 to engage the roll 111 and causes the tap engaging member 22 to be advanced to engaging position with the tap shank and to also actuate the slide 110 to compress the spring 115 as shown in Fig. 2. In the meantime the cam 140 will have completed a shift of the rod 46 to the extreme left, thus disengaging the clutch, operating the brake and locking the work. In the meantime the spindle has been continuously rotated, the cam barrel is brought to rest by the brake mechanism and the spring 115 completes the engagement of the socket of the tap engaging member 22 with the tap shank.

Referring to Figs. 2 and 5, wherein the working end of the tap is shown in engagement with the work positioning plunger 70, it will be seen if during the tapping operation the tap engages the plunger 70 with a sudden blow, because of its being rotated at a high speed, there will be a tendency for the bar 46, and its control cam 96, to be shot toward the hopper with a rebounding action. This would result in prematurely releasing the clutch for driving the cam through the members 92, 93, whereas it is desired that the tap be advanced a particular distance from the two nuts in threaded engagement therewith before the clutch operates to effect repositioning of the nuts just tapped, and representation of work pieces, as described.

Accordingly, I provide at the front end of the bar 46, a vacuum check in the nature of a sleeve 185 secured, as shown in Fig. 2, to the bearing support bracket 19. The bar 46 carries a piston 186 slidably engaging the interior surface of the sleeve 185. At the free end of the sleeve is a check valve 187 suitably arranged to release air from the chamber formed between the piston and the end of the sleeve when the bar 46 is moving forwardly or to the left, as shown in Fig. 2. However, on its rearward movement the valve 187 acts to create a vacuum in this chamber which retards the action of the bar 46 and prevents any overthrow of the bar 46 by the lap. Hence, the bar 46 will be steadied in such manner as to operate the clutch only at the proper time in the threading operation. At this time the vacuum is broken by reason of suitable vents 188 in the wall of the sleeve 185.

My preferred hopper arrangement for forwarding pieces of work to the work positioning means through the raceway 50 is shown particularly in Figs. 1, 2 and 8 to 11. The bracket 175 has an upward extension in the nature of a circular disc 190 provided with a central enlargement 192 serving to support a shaft 193 which carries a revoluble blank selecting disc 194 forming in effect an end wall of the hopper. The character of the disc is best brought out in Figs. 8 and 9. The hopper 43 is semi-circular in cross section at the discharge end, is open at the top, and extends rearwardly (to the right in Fig. 2) from the disc 194, as shown in Fig. 2. The preferred form of the storage member of the hopper is half a hollow cone 197 divided axially, tangentially joined by a hollow sphere portion 198 curving toward the apex of the cone, and having a flattened bottom portion 199 in a plane intersecting both the spherical and conical surfaces at an angle greater than the slope of the cone, the angle being greater than the angle of repose of the work. When viewed in longitudinal cross section the spherical and conical surfaces would normally continue past the flattened bottom according to the broken line 197'—198'. Viewed in plan this flattened portion 199 is somewhat egg-shaped with the small end adjacent the lowermost portion of the hopper, namely, at the lower edge of the selecting disc 194. The result of this arrangement of hopper walls is that considerable storage space for blanks is had, while by reason of the flattened bottom surfaces terminating in a blunt point at the lowermost portion of the hopper, the last blank will be fed from the hopper into engagement with the selecting disc. The slope above the flat surface 199 is, of course, somewhat greater than the angle of repose of the blanks, and since this continues to a point adjacent the lowermost edges of the disc, it will be easily seen that all the nuts will ride down toward this point. The hopper element 43 may be secured to the disc-like portion 190 of the bracket 175 as by flanges 200.

For driving the selecting disc, I provide ratchet teeth 201 on the front of the disc 194, as shown particularly in Fig 9, and coacting with these teeth are a pair of pawls 204 and 205. The pawls are reciprocated by reason of a shaft 206 supported, as shown in Fig. 1, by an overhanging bracket 207 carried by the member 175. The shaft may be rotated continuously by a belt 208 from the spindle sleeve 20. The pawls are coaxially mounted on an eccentric pin 209, hence, at every revolution of the shaft 206 the pawls are reciprocated once.

The diameter of the circle described by the axis of the pin 209 is substantially the equivalent of half a tooth 101. Hence, each pawl will move the disc a distance corresponding to half a tooth. It will be seen from Fig. 8 that on one rotation of the shaft 206 the pawl 204 will engage a tooth and carry it the distance of half its length, while the other pawl is left in a position midway between the ends of a tooth. On the next rotation the pawl 205 engages and carries the next tooth a distance of half a tooth. The result is a constant jogging of the disc 194 which jolts the nuts adjacent the disc into recesses 210 having parallel side walls formed by axially extending blocks 211. The relation of a hexagonal nut to one of these recesses is shown in Fig. 8 where this nut, designated W5, has been carried by the rotation of the disc 194 to a position where the nut could drop into the mouth portion 213 of the raceway 50. The side walls of the recesses 210 are parallel to respective tangents of a circle described, about the axis of the disc 194. This is to produce the relation of these walls to the mouth 213 of the raceway shown in which the walls slope down toward the raceway at an angle greater than the angle of repose of a nut. Even if some of the recesses should be left empty, the rotation of the disc is so timed that an adequate supply of nuts will be delivered to the raceway to keep it full at all times.

When at any time the raceway is completely filled, the surplus nuts carried in the recesses 210 are thrown back to the bottom of the hopper. The arrangement for accomplishing this comprises, as shown, a weighted deflector member 215 pivoted as at 216 to the bracket portion 190. This deflector has a curved lower end 217 which engages a nut such as that indicated at W6 and which is prevented from feeding into the mouth of the raceway 50 because the raceway is full. In order to prevent jamming, the nut at W6 simply cams against the curved surface of the plate 217 raising the member 215 against the gravitation of the weight 219, and forcing the nut W5 out of the recess back toward the hopper.

In order to relieve the drag of nuts on the disc at the selector lugs and recesses which are traveling downwardly to pick up their load, I provide an inwardly disposed flange 220, as shown in Fig. 9, which prevents nuts in the hopper from contacting with the lugs.

To hold the selector disc 194 against traveling backward by reason of being weighted only on one side by nuts traveling up toward the mouth of the raceway at a time when the pawls are retracting from the teeth, I provide a pair of gravity pawls 221 and 222 having their working ends disposed in the same relation as those of the pawls 204 and 205.

From the foregoing description of my invention it will be seen that I provide a group of coordinated mechanisms for effecting the automatic tapping of articles wherein it is desired to cut a straight thread and which will function at a high rate of speed without decreasing the normal cutting life of the tap, and will operate to arrange, position and tap a plurality of blanks simultaneously for each cycle of operations. The initiation of the actuation of the various mechanisms for repositioning the tap, for stripping the threaded work from the tap and for arranging and feeding work to the tap is controlled entirely by the advancing movement of the tap. The entire cycle of operations for re-positioning the tap to starting position takes only two revolutions of the tap spindle and since the tap is driven at maximum cutting speed practically 90% of the total time the machine is operating is devoted productively to actual cutting of threads. The operating parts are simple and few in number and of such shape and character as to be economically manufactured in an accurate manner. The machine is adaptable not only to the particular application of threading nuts, but also to the threading of conduits, T's, etc., it being only necessary to alter the character of the work arranging and supporting devices comprising part of the work holding means to operate on work of various shapes.

It will be further seen that I have provided a mechanism for receiving and storing a large quantity of blanks in disordered arrangement, selecting and arranging a series of blanks in proper relation to the tool, that is, oriented with the tool axis, and finally rearranging the blanks in multiple formation in such manner that for each cycle of operation of the machine a complete operation is begun and finished on a plurality of blanks.

I claim:—

1. In a metal cutting machine, a cutting tool, adapted to simultaneously operate upon a plurality of pieces of work, means for holding the work to be operated upon by said tool, actuating means for effecting relative rotation between the work holding means and tool, a mechanism adapted to align and hold a plurality of pieces of work for presentation to the work holding means in offset relation to the work holding means in the direction of the axis of alignment, and means for simultaneously feeding such aligned plurality of pieces of work from said mechanism to the work holding means.

2. In a metal cutting machine of the character described, the combination of a cutting tool adapted to advance with relation to the work in the machine, means adapted to hold a plurality of pieces of work to be operated upon by said tool, means for effecting relative rotation between the work holding means and the tool, and mechanism adapted to arrange a plurality of pieces of work in condition for presentation to the work holding means, and to then feed the arranged work to the work holding means, said mechanism being controlled in the initiation of its operation by a pre-determined advancing movement of the tool.

3. In a metal cutting machine of the character described, the combination of a cutting tool adapted to advance with relation to the work in the machine, means adapted to hold a plurality of pieces of work to be operated upon by said tool, means for effecting relative rotation between the work holding means and the tool, and mechanism adapted to align and hold a plurality of pieces of work to be presented to the work holding means, said aligning mechanism being controlled in the initiation of its operation by a pre-determined advancing movement of the tool.

4. In a tapping machine, a frame, a tap and means for rotating the tap, means for holding a plurality of pieces of work in substantially fixed relation to the frame while engaged by the tap whereby the work advances the tap, means arranged to become active to feed a plurality of pieces of work to the work holding means when the tap advances to a pre-determined position relative to the frame, and means associated with the latter means for selecting from a single series and aligning a plurality of pieces of work along an axis transverse to the direction of such series to present them to the work feeding means.

5. In a metal cutting machine, a cutting tool adapted to simultaneously operate upon a plurality of pieces of work, means for holding the work to be operated upon by said tool, actuating means for effecting relative rotation between the work holding means and tool, a hopper mechanism adapted to select and arrange in order a plurality of pieces of work including a work race leading to the work holding means, and means for rearranging and aligning a plurality of pieces of work as the pieces leave the race and for feeding said rearranged plurality of pieces of work to the work holding means.

6. In a metal cutting machine having a cutting tool and wherein pieces of work are machined by relative axial movement between the work and tool, means for guiding work toward the tool axis in single file, means for then arranging the leading pieces of work in rank formation, and means for relatively moving an entire rank of pieces so arranged and the tool into work cutting relation.

7. In a metal cutting machine having a cutting tool and wherein pieces of work are machined by relative axial movement between the work and tool, means for guiding work toward the tool axis in single file, means for then arranging the leading pieces of work in rank formation, and means for subsequently moving an entire rank of pieces so arranged into cooperative relation to the tool.

8. In a metal cutting machine having a cutting tool and wherein pieces of work are machined by relative axial movement between the work and tool, means for guiding work toward the tool in a direction transverse to the tool axis in single file, means for thereafter arranging the leading pieces of work in rank formation and means for thereafter moving the work so arranged into coaxial relation to the tool.

9. In a metal cutting machine, a cutting tool, means for holding work to be operated upon by said tool, means for effecting relative rotation between the work holding means and the tool, a raceway for guiding pieces of work toward the holding means in successive steps, single file, and means for arranging and conveying the work from the raceway toward the holding means at least one step in rank formation.

10. In a cutting machine having a rotatable tool, means for advancing blanks toward the tool in single file, means moving parallel to the tool axis for offsetting a leading blank from the next following blank to arrange a plurality of pieces in rank formation, said means being retractable to permit another blank to advance alongside the first, and means acting on the offset blank to hold it in offset position during such retraction.

11. In a metal cutting machine in which the work is done consequent upon relative axial movement between the work and tool, means for feeding pieces of work in single file and means for presenting a plurality of pieces of work so fed to the tool at one time, including separable means but moving in synchronism with a piece to offset it from the other pieces, and means to then cause the separable means to separate to allow the advance of another piece into substantial alignment with the first.

12. In a metal cutting machine, a cutting tool, means for holding work to be operated upon by said tool, means for effecting relative rotation between the work holding means and tool, means arranged to hold an ordered series of pieces of work to be presented to the work holding means, and means for selecting a predetermined plurality of pieces of work from said first named means and presenting them simultaneously, in aligned relation transverse to the direction of such series, to the work holding means.

13. In a tapping machine, means for holding a plurality of work blanks in a tapping position, means for arranging such plurality of blanks substantially into alignment, together with means for thereafter moving the substantially aligned blanks bodily and simultaneously into the tapping position.

14. In a metal cutting machine of the class described, a cutting tool, means for holding work to be operated on by said tool, means for effecting relative rotation between the tool and work holding means, work supply means arranged to hold an ordered series of pieces of work, means arranged to select a plurality of pieces of work from the last named means, and to rearrange the selected pieces for substantially simultaneous operation thereon by the tool, there being means to then place the rearranged pieces into said work holder.

In testimony whereof, I hereunto affix my signature.

DANIEL KELLEHER.